(12) United States Patent
Gilles

(10) Patent No.: US 10,976,499 B2
(45) Date of Patent: Apr. 13, 2021

(54) GUIDING DEVICE FOR FIBER TO ENGAGE A MECHANICAL SPLICE PROTECTOR

(71) Applicant: JONARD INDUSTRIES CORPORATION, Elmsford, NY (US)

(72) Inventor: Boone Gilles, Thumeries (FR)

(73) Assignee: JONARD TOOLS, Elmsford, NY (US)

( * ) Notice: Subject to any disclaimer, the term of this patent is extended or adjusted under 35 U.S.C. 154(b) by 26 days.

(21) Appl. No.: 16/697,551

(22) Filed: Nov. 27, 2019

(65) Prior Publication Data

US 2020/0166710 A1 May 28, 2020

(30) Foreign Application Priority Data

Nov. 28, 2018 (FR) ...................................... 1902400

(51) Int. Cl.
*G02B 6/38* (2006.01)
(52) U.S. Cl.
CPC ................................. *G02B 6/3803* (2013.01)

(58) Field of Classification Search
None
See application file for complete search history.

(56) References Cited

U.S. PATENT DOCUMENTS 4,165,914 A * 8/1979 Villarruel ............. G02B 6/3636
385/44

* cited by examiner

*Primary Examiner* — Jerry Rahll
(74) *Attorney, Agent, or Firm* — Emdadi Patent Law; Kamran Emdadi

(57) ABSTRACT

Example embodiments provide a device that includes a rigid block body with a reservoir with two angled walls, a channel dug into a center axis of a bottom of the two angled walls, a stop wall at one end of the channel and an open end at a second end of the channel, a hole at a bottom portion of the stop wall, and a cut-out funnel shaped area on an opposite side of the stop wall from the channel, and the cut-out funnel shaped area funnels into the hole.

7 Claims, 6 Drawing Sheets

GUIDING DEVICE FOR FIBER TO ENGAGE A MECHANICAL SPLICE PROTECTOR

FIELD OF INVENTION

This application relates to a device for guiding fiber and more particularly to a device that guides fiber to engage a mechanical splice protector.

BACKGROUND OF THE INVENTION

Fiber optics are delicate, small and require careful handling to avoid injury, damage to the fiber, etc. One common practice with fiber is to engage the fiber into a splice protector sleeve and, such efforts may be burdensome and often require numerous engagements at a particular time. A device that assists with such a burdensome task could alleviate the splice engagement effort.

SUMMARY OF THE INVENTION

One example embodiment may include an apparatus that includes a parallelepiped main body having a channel dug into a center axis of a top surface, a stop wall at one end of the channel and an open end at a second end of the channel, a hole at a bottom portion of the stop wall, and a conical cut-out on an opposite side of the stop wall from the channel, wherein the conical cut-out funnels into the hole.

Another example embodiment may include an apparatus that includes a rigid block body including a reservoir with two angled walls, a channel dug into a center axis of a bottom of the two angled walls, a stop wall at one end of the channel and an open end at a second end of the channel, a hole at a bottom portion of the stop wall, and a cut-out funnel shaped area on an opposite side of the stop wall from the channel, and the cut-out funnel shaped area funnels into the hole.

DETAILED DESCRIPTION

Example embodiments include a block configuration of a device having a parallelepiped foundational structure with certain hollowed portions which collectively permit for a device protective cover to be engaged with a fiber.

In general, the device is a parallelepiped (1) defined by its six rectangular sides, however, various sections are strategically removed from the parallelpiped (1) to provide a chamber and access point to house fiber protector 'sleeves' which are aligned in a focal access point one at a time.

Figure 1:
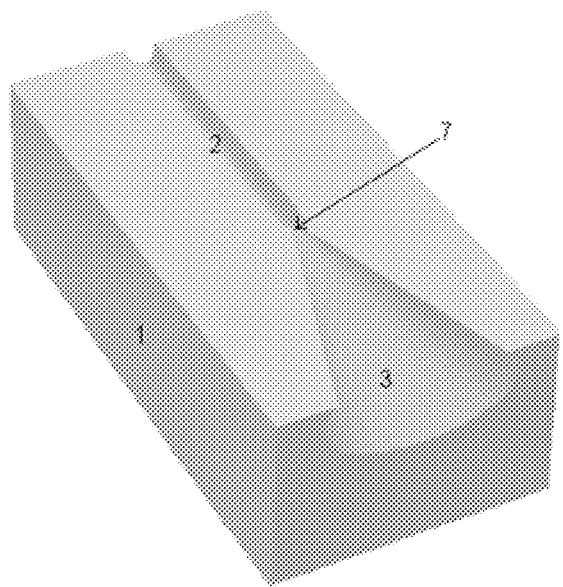
FIG. 1 illustrates the small channel (2), the hollow guide portion (3) and the stop wall (7) according to an example embodiment.
Figure 2:
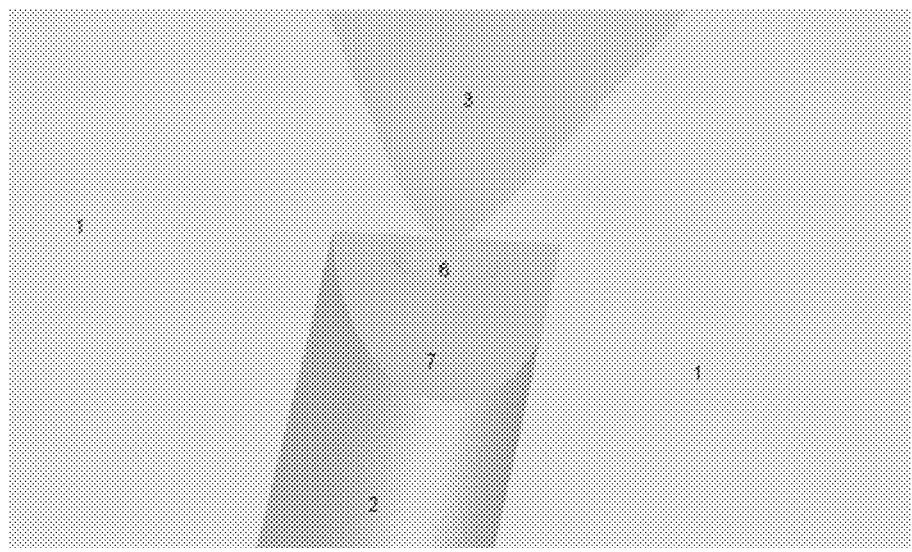
FIG. 2 illustrates a zoom view of the abutment wall portion (7) pierced by an orifice (6) located between the hollow guide portion (3) and the small channel (2) according to an example embodiment.

Referring to FIG. 1, the parallelpiped has at one of its ends and on its upper part, a guide portion (3) dug as a semi-conical engagement area, which ends with an orifice/hole (6) (see FIG. 2), for guiding the user inserted fibers towards the axis to engage a mechanical splice protector sleeve which is placed in the small dug channel (2).

Figure 3:
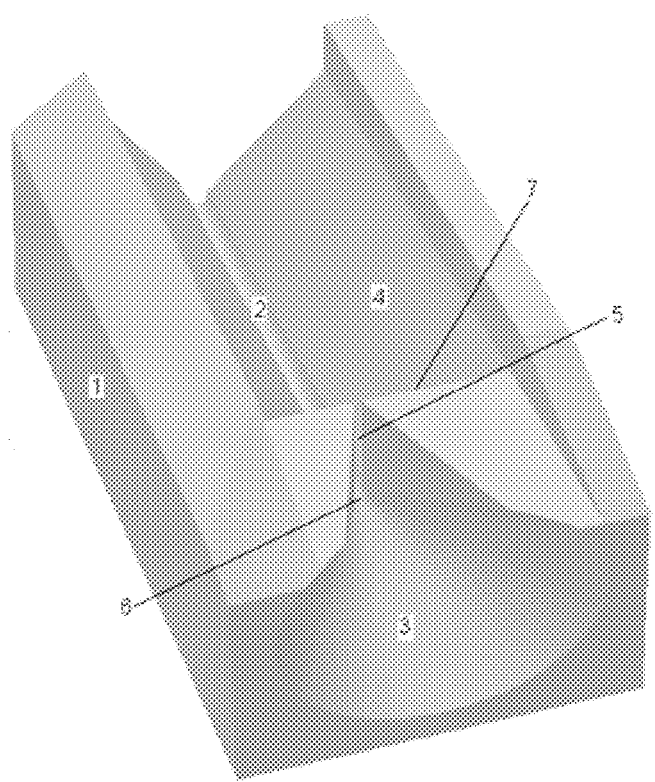
FIGS. 3 and 4 illustrate the different angles and distances of the oblique walls of the tank (4), and the stop wall (7) pierced by an orifice (6) and cut along its axis by vertical slot (5) according to another example embodiment.

In FIG. 1, at the other end of the parallelepiped (1), a small channel (2) is dug and terminated by a stop wall portion (7), which provides guidance to maintain the mechanical protection splice in the axis of the orifice (6) which connects to the hollow guide portion (3). FIG. 3 illustrates a closer perspective of the hollow guide portion (3) funneling into the orifice (6) of the stop wall portion (7).

Figure 4:
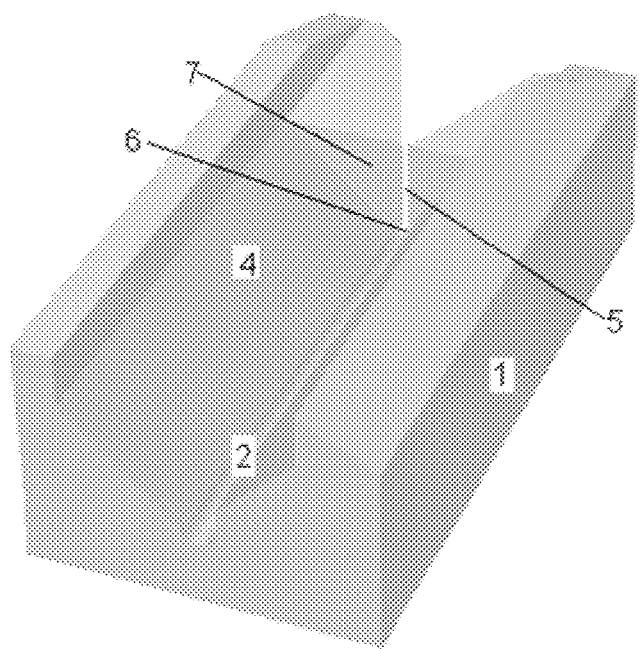
Figure 5:
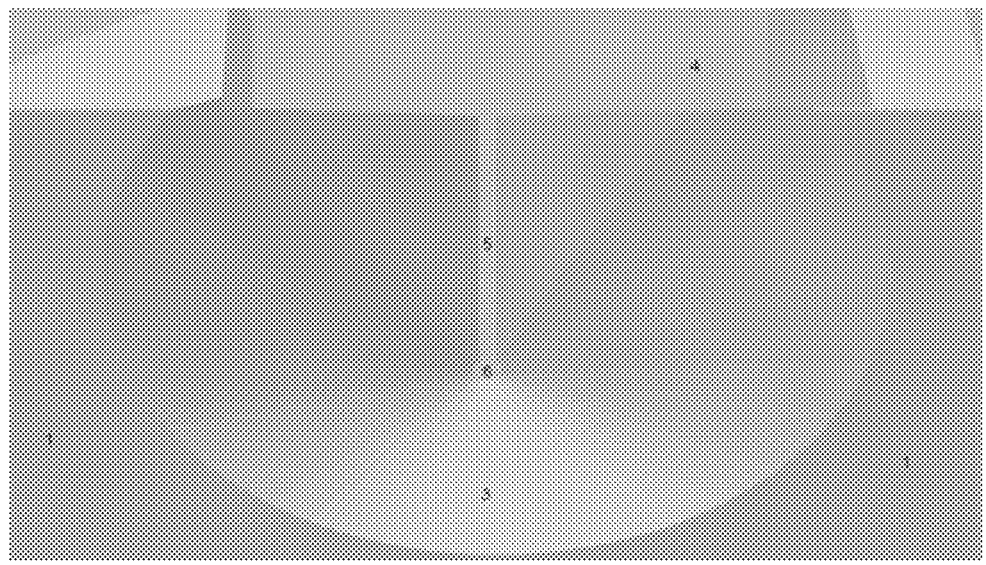
FIG. 5 illustrates a zoomed view of the slot (5) and of the cylindrical shaped orifice (6) which terminates the hollow guide portion (3) according to an example embodiment.

FIG. 4 illustrates a variation that has a reservoir/tank portion (4) for a plurality of mechanical splice protectors to be loaded such that they can feed into the center bottom channel (2) one at a time. The tank (4) may have uneven sloped/oblique walls which vary in their angle with respect to the top and bottom surfaces of the parallelepiped (1). The two oblique walls are positioned above the small channel (2) and on each side of the latter, this permits the mechanical splice protectors to fall down and lodge into the channel (2). The stop wall portion (7) located between the hollow guide portion (3) and the reservoir/tank (4), maintains an additional resting surface to keep the splice protectors angled towards the axis of the channel (2). Inside the abutment of the wall portion (7), and in the continuity position of the orifice (6) of the hollow guide portion (3), a slot (5) intersects the wall portion (7) at its center, which permits removal of a fiber after insertion into a splice protector sleeve. In this configuration, the tank (4) may hold a large quantity of splice protector sleeves while one is always fallen into the center bottom channel portion (2).

The hollow guide portion (3) is used to guide the fiber inserted by a user or automated feeder towards the axis of the small channel (2), where the mechanical splice protector is maintained in a fixed position. The fiber may be inserted at any angle, as it will be guided towards the axis of the mechanical splice protector at the orifice (6) due to the funneling angled configuration of the hollow guide part (3). The hollow guide portion (3) avoids a requirement for a manual adjustment since it guides the fiber towards the orifice (6).

The small channel (2) makes it possible to maintain the mechanical splice protector in the axis of the orifice (6) and the hollow guide portion (3).

The stop wall (7) is essentially pierced in its center to align with the axis of the orifice (6), which is located at the end of the small channel (2), on one side, and located at the end of the hollow guide portion (3) on the other side, which permits the insertion of the fiber into the mechanical splice protector one sleeve at a time.

The alternative approach of FIGS. 3, 4, 5 and 6 is equipped with the reservoir (4) which can contain a dozen or more mechanical splice protectors, the oblique side walls, permit the sleeves to drop into the small channel (2) located at the bottom of the tank (4). The abutment (7) of the reservoir (4) makes it possible to maintain in the axis of the small channel (2), the mechanical splice protectors one at a time. The shape of the channel (2) is substantially cylindrical to invite one single protection sleeve at a time so the orifice (6) is substantially aligned with the hole of the protection sleeve so the fiber can quickly enter the sleeve and be removed once engaged.

In one example, the hollow guide portion (3) has a conical shape. In another example, the hollow guide portion (3) has a pyramidal shape.

Figure 6:
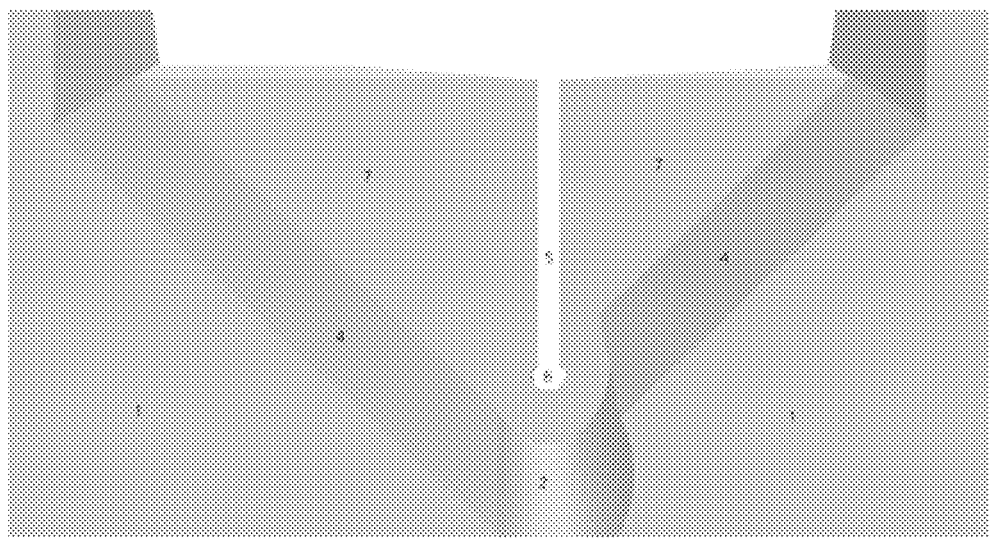
FIG. 6 illustrates a zoomed view of the slot (5) and the orifice (6) dug in the stop wall (7) which ends the small channel (2) located at the bottom of the tank (4) according to an example embodiment.

In FIG. 6, it is important to note that in certain embodiments, the angle of one side wall/oblique wall (4) is steeper/greater than the other side wall (4). The distance of the wall that is steeper may be shorter as well to provide an optimal gravitational drop for the splicer protectors so one can fall into the channel at a time and two will not wedge in the same position near the channel to frustrate the use of the device. Also, the slit (5) and hole (6) are off-centered more towards one side of the stop wall (7) in this configuration to align with the varying sizes of the side walls (4).

One example embodiment may include an apparatus that provides a parallelepiped main body having a channel dug into a center axis of a top surface, a stop wall at one end of the channel and an open end at a second end of the channel, a hole at a bottom portion of the stop wall, and a conical cut-out on an opposite side of the stop wall from the channel, the conical cut-out funnels into the hole. The channel includes a substantially cylindrical shape with an open top portion. The open top portion includes a portion that exposes approximately half or less than half of the cylindrical shape of the channel.

Another example embodiment may include a rigid block body having a reservoir with two angled walls, a channel dug into a center axis of a bottom of the two angled walls, a stop wall at one end of the channel and an open end at a second end of the channel, a hole at a bottom portion of the stop wall, and a cut-out funnel shaped area on an opposite side of the stop wall from the channel, and the cut-out funnel shaped area funnels into the hole. The stop wall traverses a majority of a distance of the two angled walls. The stop wall includes a vertical slit that traverses from the hole up to a top surface of the stop wall. A width of the vertical slit is smaller than a width of the hole. The two angled walls are angled downwardly differently from one another. One of the angled walls has a larger downward angle than the other angled wall. One of the angled walls is shorter in a downward measured distance than the other angled wall. The angled wall with the shorter downward distance has the larger downward angle.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be configured with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., materials, shapes, sizes, etc.) thereto.

What is claimed is:

1. An apparatus comprising:
   a rigid block body comprising
   a reservoir with two angled walls, wherein one of the angled walls is shorter in a downward measured distance than the other angled wall;
   a channel dug into a center axis of a bottom of the two angled walls;
   a stop wall at one end of the channel and an open end at a second end of the channel;
   a hole at a bottom portion of the stop wall; and
   a cut-out funnel shaped area on an opposite side of the stop wall from the channel, wherein the cut-out funnel shaped area funnels into the hole.

2. The apparatus of claim 1, wherein the stop wall traverses a majority of a distance of the two angled walls.

3. The apparatus of claim 1, wherein the stop wall comprises a vertical slit that traverses from the hole up to a top surface of the stop wall.

4. The apparatus of claim 3, wherein a width of the vertical slit is smaller than a width of the hole.

5. The apparatus of claim 1, wherein the two angled walls are angled downwardly differently from one another.

6. The apparatus of claim 5, wherein one of the angled walls has a larger downward angle than the other angled wall.

7. The apparatus of claim 1, wherein the angled wall with the shorter downward distance has the larger downward angle.

* * * * *